(12) United States Patent
Ma

(10) Patent No.: US 9,961,887 B2
(45) Date of Patent: May 8, 2018

(54) CARP FISHING DEVICE

(71) Applicant: Haibin Ma, Harbin (CN)

(72) Inventor: Haibin Ma, Harbin (CN)

( * ) Notice: Subject to any disclaimer, the term of this patent is extended or adjusted under 35 U.S.C. 154(b) by 178 days.

(21) Appl. No.: 15/212,276

(22) Filed: Jul. 17, 2016

(65) Prior Publication Data

US 2017/0013814 A1    Jan. 19, 2017

(30) Foreign Application Priority Data

Jul. 17, 2015    (CN) .......................... 2015 1 0423778

(51) Int. Cl.
*A01K 75/00* (2006.01)
*A01K 73/06* (2006.01)

(52) U.S. Cl.
CPC .............. *A01K 73/06* (2013.01); *A01K 75/00* (2013.01)

(58) Field of Classification Search
CPC ......... A01K 75/00; A01K 73/06; A01K 73/00
See application file for complete search history.

(56) References Cited

U.S. PATENT DOCUMENTS

| | | | | |
|---|---|---|---|---|
| 257,597 A * | 5/1882 | Long | ...................... | A01K 73/06 43/8 |
| 919,107 A * | 4/1909 | Yancey | ................... | A01K 73/06 254/359 |
| 3,124,890 A * | 3/1964 | Puretic | ................... | A01K 73/06 43/6.5 |
| 3,237,337 A * | 3/1966 | Luketa | ................... | A01K 73/06 43/4.5 |
| 3,261,122 A * | 7/1966 | Guicheney | ............. | A01K 73/02 43/14 |
| 3,264,629 A * | 8/1966 | Bus, Sr. | ................. | A01K 73/06 254/266 |
| 3,440,752 A * | 4/1969 | Minter | ................... | A01K 73/00 43/6.5 |
| 3,793,760 A * | 2/1974 | Puretic | ................... | A01K 73/06 43/4.5 |
| 3,908,291 A * | 9/1975 | Masuda | ................. | A01K 73/06 226/186 |
| 5,058,307 A * | 10/1991 | Garrett | ................... | A01K 73/06 43/9.1 |
| 5,301,450 A * | 4/1994 | Boyd | ...................... | A01K 75/00 43/104 |
| 5,575,102 A * | 11/1996 | Coulon | .................. | A01K 75/00 43/104 |
| 6,343,433 B1 * | 2/2002 | Granberg | ............... | A01K 75/00 114/255 |

(Continued)

*Primary Examiner* — Christopher P Ellis
(74) *Attorney, Agent, or Firm* — Novoclaims Patent Services LLC; Mei Lin Wong

(57) ABSTRACT

A fishing device which includes a tow boat, a noise generator, a Catamaran boat plate, a collection net assembly, a Catamaran, two rigid tow bars and a plurality of bent tubes. The collection net assembly includes an inlet net frame, a collection net, a rectangular outlet door and two blocking nets. The problems in conventional fishing methods: low fish catch and large manpower requirement which is not suitable for large scale fishing in fishing with fishhooks and small fishing nets, as well as failure to provide classification fishing for silver carp which in turn resulted in low fishing efficiency, low work efficiency and wasting of manpower in seine fishing, can be resolved effectively.

10 Claims, 2 Drawing Sheets

(56) References Cited

U.S. PATENT DOCUMENTS

| | | | |
|---|---|---|---|
| 8,191,305 B2* | 6/2012 | Gallagher | A01K 75/00 43/9.1 |
| 2017/0013813 A1* | 1/2017 | Ma | A01K 73/06 |
| 2017/0042132 A1* | 2/2017 | Hallner | A01K 75/00 |

* cited by examiner

CARP FISHING DEVICE

CROSS REFERENCE OF RELATED APPLICATION

This is a non-provisional application which claimed priority of Chinese application number 201510423778.8, filing date Jul. 17, 2015. The contents of this specification, is incorporated herein by reference.

BACKGROUND OF THE PRESENT INVENTION

Field of Invention

The present invention relates a fishing device, and more particularly to fishing device for silver carp (*Hypophthalmichthys molitrix*).

Description of Related Arts

Conventional fishing methods which are commonly used for silver carp fishing includes fishhooks fishing, fishing by small fishing nets and seine fishing using a seine or dragnet. However, in waters with relatively high density of silver carp, the use of fishhooks and small fishing nets for fishing has the drawbacks of low fish catch and large manpower requirement, which is not suitable for large scale fishing. When seine fishing is used, the fish being caught may escape into the water easily and classification fishing for silver carp cannot be achieved. Hence, the fishing efficiency is affected. In short, the work efficiency is low and the manpower is wasted.

SUMMARY OF THE PRESENT INVENTION

In order to solve the problems of silver carp fishing in waters with relatively high density of silver carp in common fishing methods, which are: low fish catch and large manpower requirement which is not suitable for large scale fishing in fishing with fishhooks and small fishing nets, and failure to provide classification fishing for silver carp which in turn resulted in low fishing efficiency, low work efficiency and wasting of manpower in seine fishing, an object of the present invention is to provide a fishing device for silver carp which can resolve the above problems.

Additional advantages and features of the invention will become apparent from the description which follows, and may be realized by means of the instrumentalities and combinations particular point out in the appended claims.

According to the present invention, the foregoing and other objects and advantages are attained by the followings:

A fishing device, which includes a tow boat, a noise generator, a Catamaran boat plate, a collection net assembly, a Catamaran, two rigid tow bars and a plurality of bent tubes. The collection net assembly includes an inlet net frame, a collection net, a rectangular outlet door and two blocking nets. The Catamaran boat plate is a bent plate. The blocking net comprises a triangular net frame and a net unit fittingly provided on the net frame. The inlet net frame comprises a cylindrical body defining two end openings at two ends and an inlet net unit surrounding the cylindrical body. The collection net comprises a cylindrical body defining two end openings at two ends and a collection net unit surrounding the cylindrical body. The right end of the inlet net frame is connected through the left end of the collection net. The rectangular outlet door is mounted to the right end of the collection net. The bottom of the rectangular outlet door is hinged to arrange on the bottom end opening on the right end of the collection net. The top of the rectangular outlet door is arranged on an open end of the rectangular frame of the collection net. A net unit for the rectangular outlet door is fittingly provided for the rectangular outlet door. The two blocking nets are vertically and fixedly mounted on the left end of the inlet net frame. The Catamaran boat plate is fixedly mounted on the Catamaran. The Catamaran boat plate has a front portion upwardly projected perpendicularly along a forward direction of the ship body of the Catamaran. The bent plate of the Catamaran boat plate has a front end fixedly mounted on the bow of the Catamaran and a rear end fixedly mounted on the stern of the Catamaran. The plurality of bent tubes is arranged in parallel and are fixedly mounted on top of the top side of the Catamaran. The two blocking nets, the inlet net frame and the collection net are mounted on the plurality of bent tubes sequentially from left to right direction. The left side of the bow of the Catamaran is connected to the tow boat. The stern of the tow boat is hinged with the two rigid tow bars respectively. The two rigid tow bars are connected to the two hulls of the Catamaran respectively. The noise generator is fixedly mounted on the tow boat.

The advantageous effects according to the present invention are:

(a) the present invention is targeted on fishing in waters with relatively high density of silver carp. Through the tow boat 1 and the noise generator 6, a great noise level is generated. When the tow boat is moving, the silver carps will be frightened and swimming around the water surface. When the fish jumps out of the water or swims around the water surface, through the plurality of bent tubes 10 in the bow of the Catamaran 4, the fish is guided through the bent tubes 10 to slide inside the collection net assembly 3. Thus a large number of fishes is collected and the fishing efficiency is greatly increased.

(b) the collection net assembly 3 includes two mounting brackets 15. When the fish catch quantities in the collection net assembly 3 is relatively high, a crane can be used to hook onto the mounting brackets 15 to move the collection net assembly 3 to the fish loading zone. Then, the rectangular outlet door 11 is open and the fish is loaded to a designated zone, which greatly increase the fishing efficiency while a high survival rate of fish catch can be ensured.

(c) the present invention does not require the use of mesh or screen or its maintenance. Thus the cost is saved while the work efficiency of silver carp fishing is increased.

(d) the present invention can save a lot of manpower and lower the labor requirement.

(e) the present invention is simple in structure, convenience in operation and has high efficiency. In addition, no damages to the fish catch is caused by the present invention such that the survival of fish catch can be ensured and the resources utility rate is increased.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Preferred Embodiment 1

Figure 1:
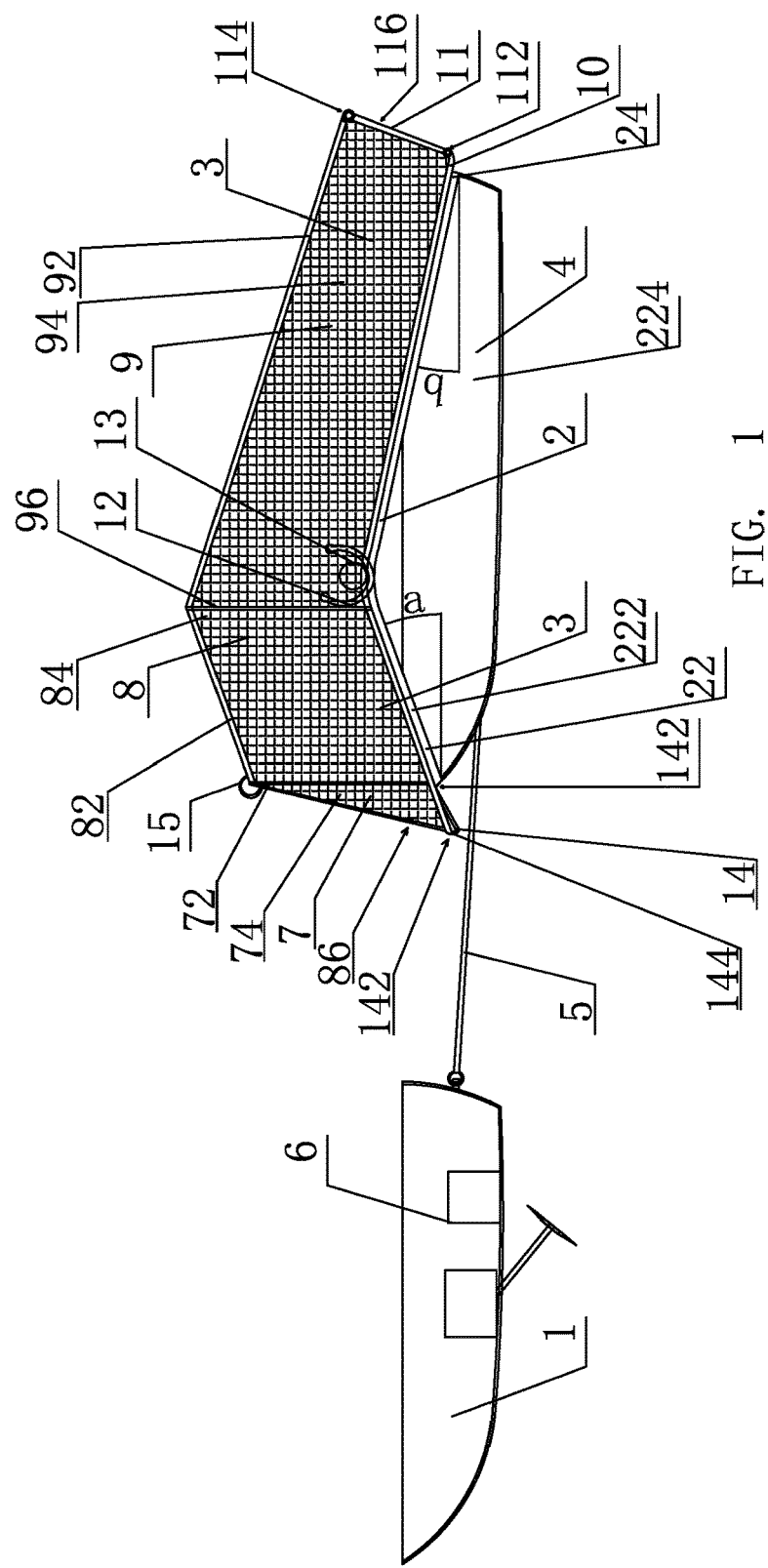
FIG. 1 is an illustration of the fishing device for silver carp according to a preferred embodiment of the present invention.
Figure 2:
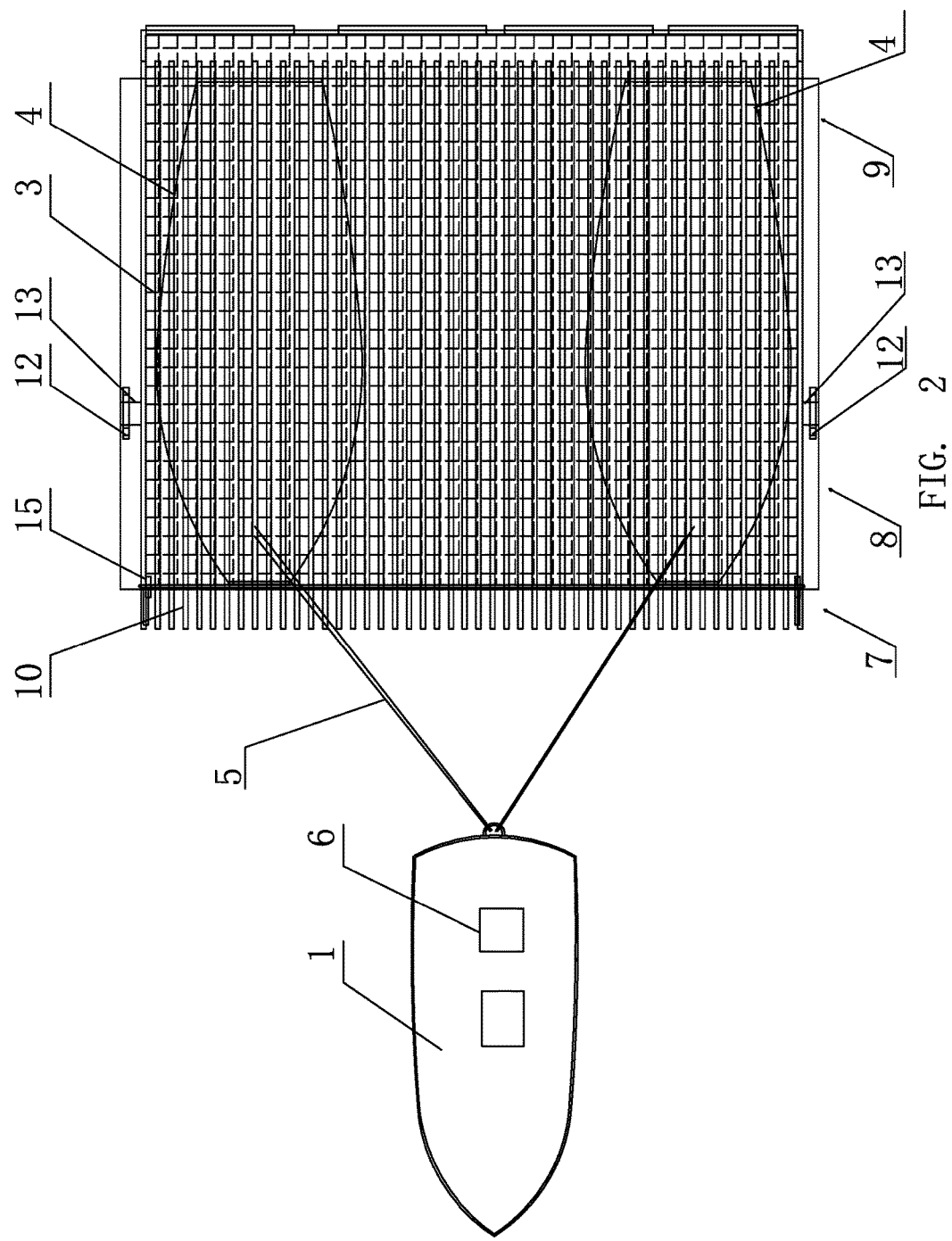
FIG. 2 is a top view illustration of the fishing device for silver carp according to the above preferred embodiment of the present invention.

Referring to FIG. 1 and FIG. 2 of the drawings, the fishing device for silver carp according to this preferred embodiment of the present invention is illustrated. The fishing device for silver carp is particularly designed to catch silver carp (Hypophthalmichthys molitrix). According to this preferred embodiment, the fishing device includes a tow boat 1, a noise generator 6, a Catamaran boat plate 2, a collection net assembly 3, a Catamaran 4, two rigid tow bars 5 and a plurality of bent tubes 10. The collection net assembly 3 includes an inlet net frame 8, a collection net 9, a rectangular outlet door 11 and two blocking nets 7. The Catamaran boat plate 2 comprises a bent plate 22. The blocking net 7 comprises a triangular net frame 72 and a net unit 74 fittingly provided on the net frame 72. The inlet net frame 8 comprises a cylindrical body 82 defining two end openings at two ends and an inlet net unit 84 surrounding the cylindrical body 82. The collection net 9 comprises a cylindrical body 92 defining two end openings 96 at two ends and a collection net unit 94 surrounding the cylindrical body 92. The right end of the inlet net frame 8 is connected to the left end of the collection net 9. The rectangular outlet door 11 is mounted to the right side of the collection net 9. The bottom 112 of the rectangular outlet door 11 is hinged to arrange on the bottom end opening on the right side of the collection net 9. The top 114 of the rectangular outlet door 11 is arranged on an open end of the rectangular frame of the collection net 9. A net unit for the rectangular outlet door 11 is fittingly provided for the rectangular outlet door 11. The two blocking nets 7 are vertically and fixedly mounted on the left end of the inlet net frame 8. The Catamaran boat plate 2 is fixedly mounted on the Catamaran 4. The Catamaran boat plate 2 has a front portion upwardly projected perpendicularly along a forward direction of the ship body of the Catamaran. The bent plate 22 of the Catamaran boat plate 2 has a front end fixedly mounted on the bow of the Catamaran and a rear end fixedly mounted on the stern of the Catamaran. The plurality of bent tubes 10 is arranged in parallel and are fixedly mounted on top of the top side of the Catamaran 2. The two blocking nets 7, the inlet net frame 8 and the collection net 9 are mounted on the plurality of bent tubes 10 sequentially from left to right direction. The left side of the bow of the Catamaran 2 is connected to the tow boat 1. The stern of the tow boat 1 is hinged with the two rigid tow bars 5 respectively. The two rigid tow bars 5 are connected to the two hulls of the Catamaran 2 respectively. The noise generator 6 is fixedly mounted on the tow boat 1.

Preferred Embodiment 2

Referring to FIG. 1 and FIG. 2 of the drawings, the fishing device for silver carp according to this preferred embodiment of the present invention is illustrated. According to this preferred embodiment, the fishing device further comprises two U-shaped hooks 12 and two positioning shafts 13. The two U-shaped hooks 12 are mounted on two lateral sides of the Catamaran boat plate 2. The bent plate 22 of the Catamaran boat plate 2 defines an uppermost point 24 and the U-shaped hooks 12 are arranged to position at the uppermost point 24 of the bent plate 22 of the Catamaran boat plate 2. The U-shaped hook 12 has one top opening 122 which is arranged to face upwardly. The collection net assembly 3 has two lateral sides 32 and one positioning shaft 13 is mounted on one lateral side 32. The positioning shaft 13 is arranged to position at the opening 122 of the U-shaped hook 12. In other words, the two openings 122 of the two U-shaped hooks 12 supports the two positioning shafts 13 respectively. All other elements and connection relationships are the same as that of the preferred embodiment 1.

Preferred Embodiment 3

Referring to FIG. 1 and FIG. 2 of the drawings, the fishing device for silver carp according to this preferred embodiment of the present invention is illustrated. According to this preferred embodiment, the bent plate 22 of the Catamaran boat plate 2 comprises a front plate portion 222 at the front end of the bent plate 22 of the Catamaran boat plate 2 which is connected to the bow of the Catamaran 4 and a rear plate portion 224 at the rear end of the bent plate 22 of the Catamaran boat plate 2 which is connected to the stern of the Catamaran 4. The front plate portion 222 defines a front angle 'a' between the front plate portion 222 and the horizontal plane, where 'a' has a range of 10°-20°. The rear plate portion 224 defines a rear angle 'b' between the rear plate portion 224 and the horizontal plane, where 'b' has a range of 10°-15°. All other elements and connection relationships are the same as that of the preferred embodiment 1.

Preferred Embodiment 4

Referring to FIG. 1 and FIG. 2 of the drawings, the fishing device for silver carp according to this preferred embodiment of the present invention is illustrated. According to this preferred embodiment, the fishing device further comprises a plurality of supporting tubes 14 defining two connecting ends 142. The supporting tube 14 has a curved tube body 144 at one of the connecting ends 142. The connecting end 142 of the curved tube body 144 is fixedly mounted to one end of the bent tube 10 and the other connecting end 142 is fixedly mounted on the bent tube 10. All other elements and connection relationships are the same as that of the preferred embodiment 1.

Preferred Embodiment 5

Referring to FIG. 1 and FIG. 2 of the drawings, the fishing device for silver carp according to this preferred embodiment of the present invention is illustrated. According to this preferred embodiment, the fishing device further comprises two mounting brackets 15. The mounting bracket 15 is fixedly mounted at a position between the blocking net 7 and the inlet net frame 8. All other elements and connection relationships are the same as that of the preferred embodiment 4.

Work Principle

The operation of the fishing device for silver carp according to the present invention is illustrated is follows: The fishing device is dragged into the water. The bent tubes 10 at the front end of the Catamaran 4 is extended to below the water surface. When fishing, start the tow boat 1 and the Catamaran 4 respectively. Drive the tow boat 1 and the Catamaran 4 at the same speed and at the same time turn on the noise generator 6 on the tow boat 1. When the tow boat 1 and the noise generator 6 generates noise to the fish around the tow boat 1, the fish around the tow boat 1 will tend to swim in the water surface or jumping out of the water. After the tow boat 1 moves forward, the net opening of the collection net assembly 3 on the Catamaran 4 moving behind the tow boat 1 will be in a corresponding position to collect the fish around the water surface or the fish jumping out of the water. When the fishes are collected, the two mounting brackets 15 are hooked and lifted by a crane and the collection net assembly 3 is moved to a fish loading zone. Then the rectangular outlet door 11 of the collection net assembly 3 is open and the fish catch is loaded. After loading the fish catch, the collection net assembly 3 is moved back to the Catamaran boat plate 2 and the two positioning shafts 13 are positioned on the two U-shaped hooks 12. Then, the fishing device can be used for fishing again repeatedly and the object of the present invention is achieved.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A fishing device for carp, comprising: a tow boat (1), a noise generator (6), a Catamaran boat plate (2), a collection net assembly (3), a Catamaran (4), two rigid tow bars (5) and a plurality of bent tubes (10), wherein said collection net assembly (3) comprises an inlet net frame (8), a collection net (9), a rectangular outlet door (11) and two blocking nets (7), wherein said Catamaran boat plate (2) is a bent plate, wherein said blocking net (7) comprises a triangular net frame and a net unit fittingly provided on said net frame, wherein said inlet net frame (8) comprises a cylindrical body defining two end openings at two ends and an inlet net unit surrounding said cylindrical body, wherein said collection net (9) comprises a cylindrical body defining two end openings at two ends and a collection net unit surrounding said cylindrical body, wherein said right end of said inlet net frame (8) is connected therethrough said left end of said collection net (9), wherein said rectangular outlet door (11) is mounted to said right end of said collection net (9), wherein a bottom of said rectangular outlet door (11) is hinged to arrange on said bottom end opening on said right end of said collection net (9), wherein said top of said rectangular outlet door (11) is arranged on an open end of said rectangular frame of said collection net (9), wherein a net unit for said rectangular outlet door (11) is fittingly provided for said rectangular outlet door (11), wherein said two blocking nets (7) are vertically and fixedly mounted on said left end of said inlet net frame (8), wherein said Catamaran boat plate (2) is fixedly mounted on said Catamaran (4), wherein said Catamaran boat plate (2) has a front portion upwardly projected perpendicularly along a forward direction of said ship body of said Catamaran, wherein said bent plate (22) of said Catamaran boat plate (2) has a front end fixedly mounted on said bow of said Catamaran and a rear end fixedly mounted on said stern of said Catamaran, wherein said plurality of bent tubes (10) are arranged in parallel and are fixedly mounted on top of said top side of said Catamaran (2), wherein said two blocking nets (7), said inlet net frame (8) and said collection net (9) are mounted on said plurality of bent tubes (10) sequentially from left to right direction, wherein said left side of said bow of said Catamaran (2) is connected to said tow boat (1), wherein said stern of said tow boat (1) is hinged with said two rigid tow bars (5) respectively, wherein said two rigid tow bars (5) are connected to two hulls of said Catamaran (2) respectively, wherein said noise generator (6) is fixedly mounted on said tow boat (1).

2. The fishing device according to claim 1, wherein said fishing device further comprises two U-shaped hooks (12) and two positioning shafts (13), wherein said two U-shaped hooks (12) are mounted on two lateral sides of said Catamaran boat plate (2), wherein said bent plate (22) of said Catamaran boat plate (2) defines an uppermost portion (24) and said U-shaped hooks (12) are arranged to position at said uppermost portion (24) of said bent plate (22) of said Catamaran boat plate (2), wherein said U-shaped hook (12) has one top opening facing upwardly, wherein said collection net assembly (3) has two lateral sides and one said positioning shaft (13) is mounted on one said lateral side (32), wherein said positioning shaft (13) is arranged to position on said opening of said U-shaped hook (12).

3. The fishing device according to claim 1, wherein said bent plate (22) of said Catamaran boat plate (2) comprises a front plate portion at said front end of said bent plate (22) of said Catamaran boat plate (2) which is connected to said bow of said Catamaran (4) and a rear plate portion at said rear end of said bent plate (22) of said Catamaran boat plate (2) which is connected to said stern of said Catamaran 4, wherein said front plate portion defines a front angle 'a' between said front plate portion and the horizontal plane, where 'a' has a range of 10°-20°, wherein said rear plate portion defines a rear angle 'b' between said rear plate portion and the horizontal plane, where 'b' has a range of 10°-15°.

4. The fishing device according to claim 1, further comprising a plurality of supporting tubes (14) defining two connecting ends, wherein said supporting tube (14) has a curved tube body at one said connecting ends, wherein said connecting end at said curved tube body is fixedly mounted to one end of said bent tube (10) and said connecting end at another end is fixedly mounted on said bent tube (10).

5. The fishing device according to claim 1, further comprising two mounting brackets (15) fixedly mounted at a position between said blocking net (7) and said inlet net frame (8).

6. A carp fishing device, comprising:
a tow boat;
a noise generator on said tow boat;
a boat having a boat body which comprises two hulls interconnecting with each other connecting to a stern end of said tow boat through two rigid tow bars connecting to said two hulls respectively such that said boat is positioned at a preset distance relative to said tow boat, and a boat plate fixedly mounted to said boat body which comprises a front portion, a rear portion and an uppermost portion between said front portion and said portion upwardly projected perpendicularly along a horizontal plane such that a bent plate structure is constructed, wherein said front portion of said boat plate is fixedly mounted to a bow of said boat body and said rear portion of said boat plate is fixedly mounted to a stern of said boat body;
a plurality of bent tubes fixedly mounted on top of said boat and are aligned in parallel with each other arranged for guiding a moving direction of a fish object; and a collection net assembly provided through said boat plate arranged for retaining the fish object, said collection net assembly comprises an inlet net frame, a collection net, an outlet door and two blocking nets, wherein each said blocking net comprises a triangular net frame and a net unit fittingly provided on said net frame, wherein said inlet net frame comprises a cylindrical body defining two end openings at a front end and a rear end respectively and an inlet net unit surrounding said cylindrical body, wherein said collection net comprises a cylindrical body defining two end openings at a front end and a rear end respectively and a collection net unit surrounding said cylindrical body, wherein said inlet net frame is connected to said collection net such that said inlet net frame is channel through said collection net, wherein said outlet door is provided on said collection net at a bottom portion and a net unit is fittingly provided for said outlet door, wherein said two blocking nets are vertically and fixedly mounted on two sides of said inlet net frame arranged for blocking movement of the fish object, wherein said two blocking nets, said inlet net frame and said collection net are supported by said plurality of bent tubes and are arranged in sequence from the bow end to the stern end of said boat, wherein the fish object is guided to enter into said collection net from said inlet net frame through said plurality of bent tubes.

7. The carp fishing device according to claim 6, further comprising two U-shaped hooks and two positioning shafts on two lateral sides of said boat plate respectively, wherein said U-shaped hooks are positioned at said uppermost portion of said bent plate and has one top opening arranged to support said positioning shafts.

8. The carp fishing device according to claim 7, wherein said front portion defines a front angle 'a' between said front portion and the horizontal plane, where 'a' has a range of 10°-20°, wherein said rear portion defines a rear angle 'b' between said rear portion and the horizontal plane, where 'b' has a range of 10°-15°.

9. The carp fishing device according to claim 8, further comprising a plurality of supporting tubes, each said supporting tube is connected to one said bent tubes at a front end.

10. The carp fishing device according to claim 9, further comprising two mounting brackets fixedly mounted at a position between said blocking net and said inlet net frame.

\* \* \* \* \*